(No Model.)
A. MILLER.
AMALGAMATING APPARATUS.
No. 311,353.  Patented Jan. 27, 1885.
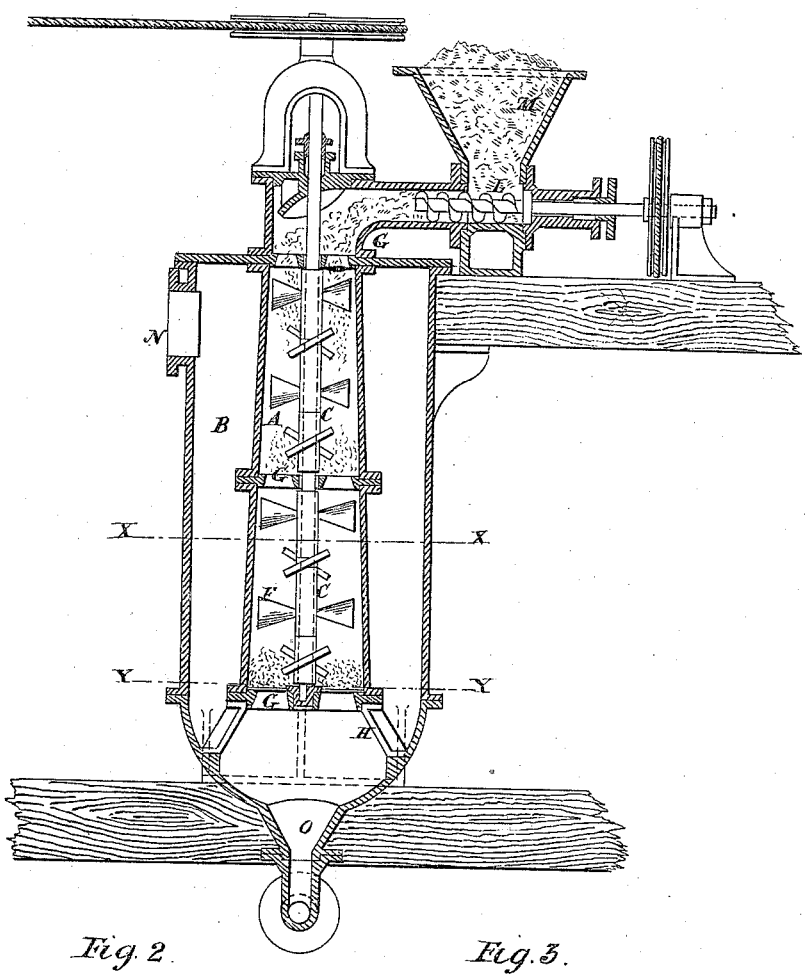
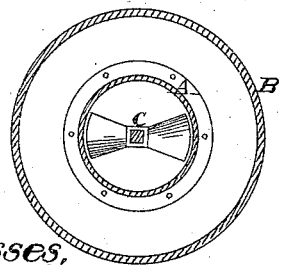
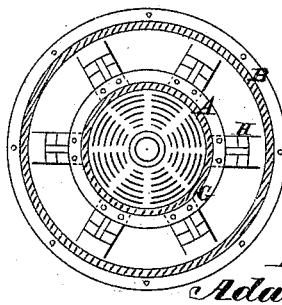
Witnesses,
J. A. Rutherford
Robert Everett
Inventor,
Adam Miller,
By James L. Norris,
Atty.

UNITED STATES PATENT OFFICE.

ADAM MILLER, OF LONDON, ENGLAND.

AMALGAMATING APPARATUS.

SPECIFICATION forming part of Letters Patent No. 311,353, dated January 27, 1885.

Application filed November 6, 1884. (No model.) Patented in England June 18, 1884, No. 9,151; in France September 11, 1884; in Belgium September 15, 1884, No. 66,310; in Germany September 26, 1884, and in Austria October 11, 1884.

*To all whom it may concern:*

Be it known that I, ADAM MILLER, a citizen of England, residing at Lime Street, in the city of London, England, engineer, have invented a new and useful Amalgamating Apparatus, (for which I have made application for patents in Great Britain, dated June 18, 1884, No. 9,151; in France, dated September 11, 1884; in Belgium, dated September 15, 1884, No. 66,310; in Germany, dated September 26, 1884, and in Austria, dated October 11, 1884,) of which the following is a specification.

My invention relates to apparatus for extracting by amalgamation precious metals from pulverized ores, tailings, or other material containing them. The object which I have in view is to provide for thorough exposure of the metallic particles to the action of the amalgamating metal, and for conducting the apparatus in a continuous manner.

I will describe my invention, referring to the accompanying drawings, which represent an apparatus suitable for amalgamating by mercury.

When molten metal—such as molten lead or alloy—is used instead of mercury, the apparatus is generally similar to that shown, but it is placed over a fire or in a heated flue to keep the amalgamating metal in a fluid condition, and in order to prevent oxidation of the molten metal I keep the apparatus above its level supplied with combustible gas, such as that obtained from a gas-producer.

Figure 1 is a vertical section, Fig. 2 a cross-section on line X X, and Fig. 3 a cross-section on line Y Y, of amalgamating apparatus according to my invention.

The apparatus consists of a slightly-tapering vessel, A, communicating at top by a lateral passage with a hopper, M, containing a horizontal feeding-screw, L, and at bottom with a surrounding cylindrical vessel, B, closed at top, and having an outlet at N, the vessel A being supported in B by feet H.

Within the vessel A is a revolving shaft, C, having helical blades F, and it is also provided with several grids, G.

At the bottom of the vessel B is a passage, O, for drawing off the amalgam. The vessels A and B being charged with mercury, say, to about the line $x\,x$, Fig. 1, and the shaft C and screw L caused to revolve by any suitable motor, the ore, tailings, or other material to be treated is fed into the hopper M, and by the rotation of the screw is continuously fed into the top of the vessel A, where it is caused to descend through the mercury by the action of the blades F, the grids G subdividing and distributing it as it descends. From the bottom of the vessel A the material passes into the vessel B, in which it ascends through the mercury, and is finally discharged through the opening N, having in its course through the mercury left a large portion of the precious metal which it contained amalgamated with the mercury. The amalgam or the mercury can, when required, be withdrawn by opening a valve in the outlet-pipe O.

It is essential that the feeding-screw L should fit the feed-channel with tolerable accuracy, so as to prevent the escape of the ore back between the two, as some force is required to cause the ore to descend through the mercury.

I do not broadly claim in this application the outer and inner concentric vessels, the latter being provided with grids, and the central shaft having the helical blades, as such construction is shown in my applications filed of even date herewith, Serial No. 147,297 and No. 147,298.

I am aware that it is not new to arrange a screw within a tube having a hopper at its upper end to force the ore downward through the tube into an outer vessel containing amalgam.

I am also aware that a screw has been arranged to force ore downward into a vessel contained within an outer vessel, a vertical shaft with stirring-arms being arranged within the inner vessel. Such features therefore I do not broadly claim.

Having thus described the nature of my invention and the best means I know for carrying the same into practical effect, I claim—

In an amalgamating apparatus, the combination of the two concentric vessels A and B, the hopper M, the lateral passage connecting the hopper and inner vessel, the screw L, arranged horizontally in the lateral passage, the vertical shaft C, the grids G, through which the shaft passes, and the helical blades F, on the shaft between the upper and lower grids, substantially as described.

In testimony whereof I have signed my name to this specification, in the presence of two subscribing witnesses, this 17th day of October, A. D. 1884.

ADAM MILLER.

Witnesses:
J. MULLENGER,
JNO. P. M. MILLARD.